United States Patent

[11] 3,576,502

[72] Inventors Wilbur D. Johnston, Jr.;
 Tingye Li, Middletown; Peter W. Smith,
 Little Silver, N.J.
[21] Appl. No. 728,502
[22] Filed May 13, 1968
[45] Patented Apr. 27, 1971
[73] Assignee Bell Telephone Laboratories, Incorporated
 Murray Hill, N.J.

[54] TRANSVERSE MODE SWITCHING AND IMAGE AMPLIFICATION IN OPTICAL MASERS
16 Claims, 15 Drawing Figs.
[52] U.S. Cl. .................................................... 331/94.5,
 330/4.3, 333/83
[51] Int. Cl. ........................................................ H01s 3/00
[50] Field of Search ............................................ 331/94.5;
 330/4.3; 307/112

[56] References Cited
UNITED STATES PATENTS
3,452,286 6/1969 Adler .............................. 250/213
3,426,286 2/1969 Miller ............................. 331/94.5

OTHER REFERENCES
Johnson et al., " IEEE Journal of Quantum Electronics," July 1968, pp 469— 471. 331-94.5

Primary Examiner—John Kominski
Assistant Examiner—Darwin R. Hostetter
Attorneys—R. J. Guenther and Arthur J. Torsiglieri ABSTRACT: Transverse mode switching is accomplished in a laser oscillating in at least one transverse mode by the injection therein of a low level seeding signal of the desired output mode. If the laser is designed to enhance transverse mode competition (i.e., the cavity geometry approaches either a concentric or plane parallel configuration), then a seeding signal of the correct frequency will cause the laser to switch (i.e., spatially lock) to oscillation entirely in the injected mode. In addition, if the cavity resonator is frequency degenerate at the frequency of a complex (i.e., many transverse modes) input signal, and if the resonator is designed to provide approximately equal gain for all of these transverse modes, then the laser will lock onto the transverse modes of the input signal and image-amplify the signal.

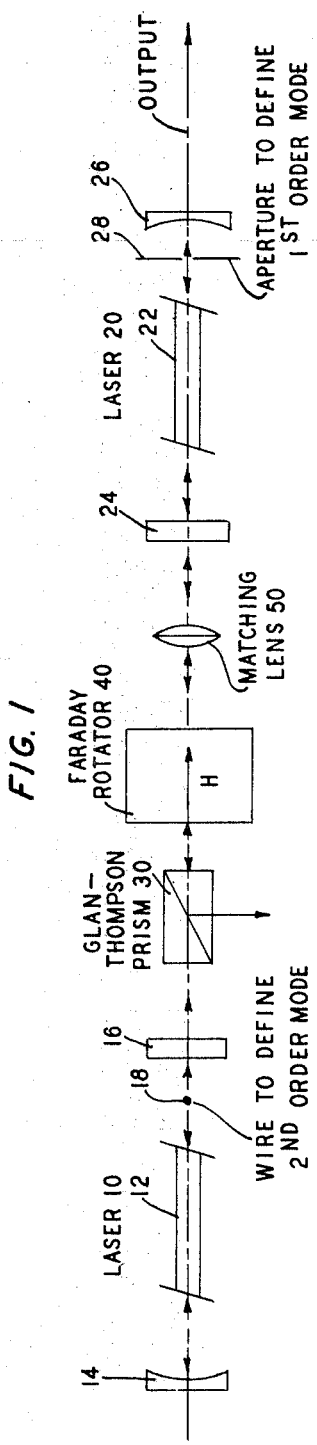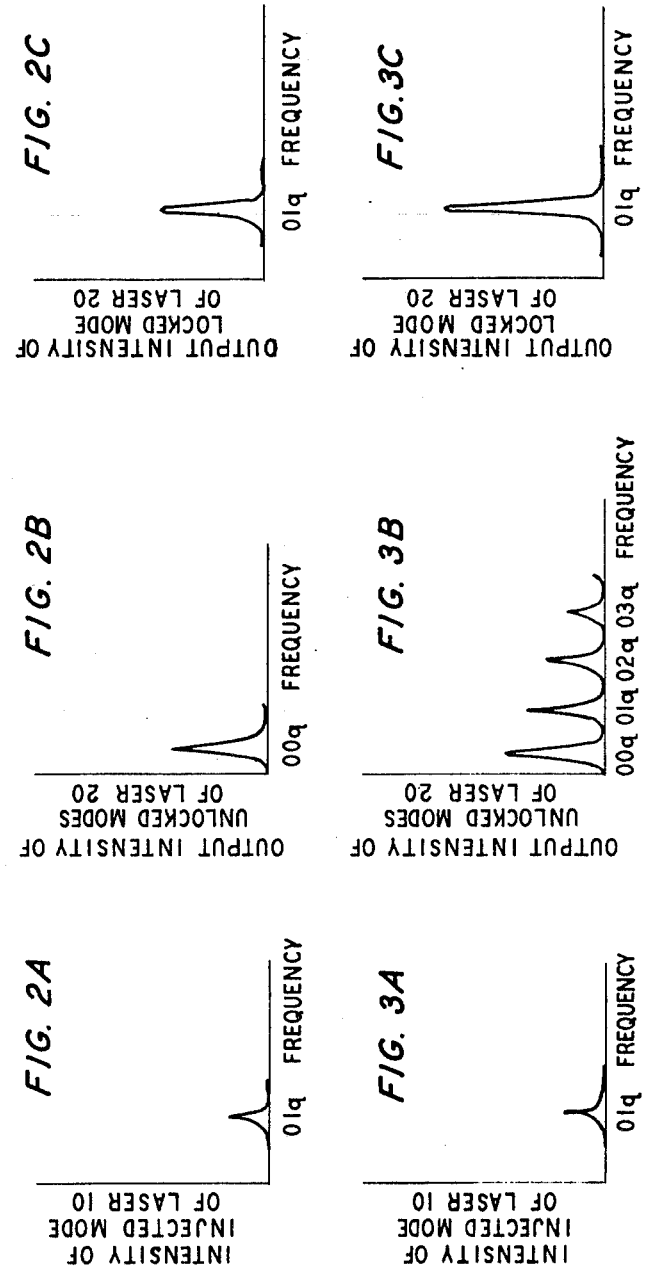
3,576,502
PATENTED APR 27 1971
SHEET 1 OF 2
FIG. 1
FIG. 2A, FIG. 2B, FIG. 2C
FIG. 3A, FIG. 3B, FIG. 3C
INVENTORS
W. D. JOHNSTON, JR.
T. LI
P. W. SMITH
BY David P. Kelley
ATTORNEY

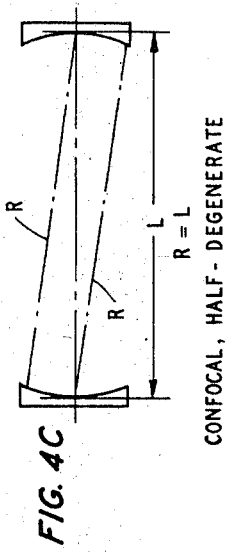

FIG. 4C CONFOCAL, HALF-DEGENERATE R=L

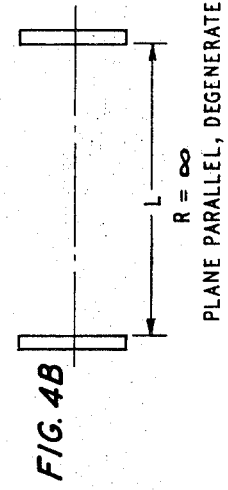

FIG. 4B PLANE PARALLEL, DEGENERATE R=∞

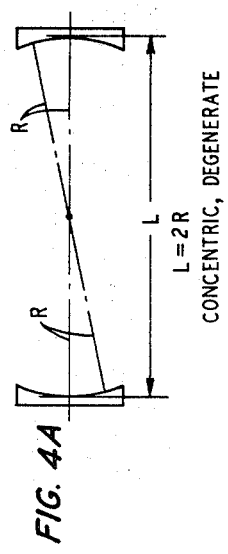

FIG. 4A CONCENTRIC, DEGENERATE L=2R

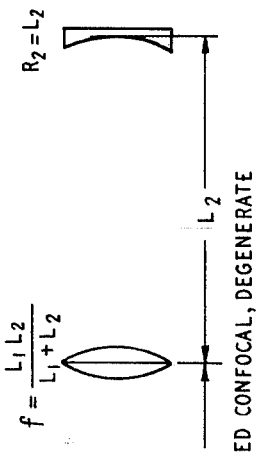

FIG. 4E MODIFIED CONFOCAL, DEGENERATE
$R_2 = L_2$
$f = \dfrac{L_1 L_2}{L_1 + L_2}$
$R_1 = L_1$

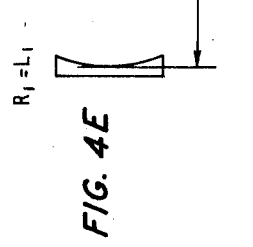

FIG. 4D HALF-CONFOCAL
$R/2 = L/2$

FIG. 5C INTENSITY OF AMPLIFIED OUTPUT-LOCKED OSCILLATOR MODES
TRANSVERSE MODE ORDER (ALL AT SAME FREQUENCY)

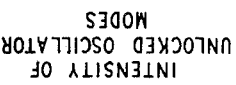

FIG. 5B INTENSITY OF UNLOCKED OSCILLATOR MODES
TRANSVERSE MODE ORDER (ALL AT SAME FREQUENCY)

FIG. 5A INTENSITY OF INPUT MODES
TRANSVERSE MODE ORDER (ALL AT SAME FREQUENCY)

3,576,502

TRANSVERSE MODE SWITCHING AND IMAGE AMPLIFICATION IN OPTICAL MASERS

BACKGROUND OF THE INVENTION

This invention relates to transverse mode switching, spatial mode locking, and image amplification in optical masers.

The recent development of coherent light amplifiers and oscillators, now generally referred to as "optical masers" or "lasers", has made feasible a host of new uses and applications of electromagnetic wave energy in the optical portion of the spectrum. Light waves produced by such devices can be sharply focused to produce energy densities suitable for welding, cutting, drilling and similar purposes. Furthermore, the high degree of monochromaticity obtainable from an optical maser makes it a useful tool for spectroscopic investigations as well as for stimulating various types of chemical and physical reactions. Among the most promising applications of coherent light are those in the field of communications where the optical spectrum represents virtually unlimited bandwidth and information carrying capacity. See, for example, Miller, S.E., "Communications by Laser," Scientific American, 214:19, Jan. 1966.

To perform the logic and other functions required by optical communications systems, it is advantageous to have a bistable optical device, i.e., a device capable of performing a binary ON-OFF (and perhaps memory) function at optical frequencies.

In another respect, one problem which arises in an optical communications system, based upon either amplitude or pulse code modulation, is that beam distortion limits the performance of conventional optical receivers. In a typical laser communications system the transmitting laser is adapted to emit a beam in only the first order transverse mode. However, the beam may be distorted by the transmission medium coupling the transmitter to the receiver resulting in the generation of higher order spurious modes. Because of this distortion, it is difficult to amplify and detect the laser signal in the conventional manner. For example a conventional optical amplifier is designed to amplify only the lowest order mode. Thus a significant amount of signal power may be lost with consequent degradation of the signal-to-noise ratio of the receiver.

Similarly, it may be desirable to amplify a weak complex signal, i.e., one composed of many transverse modes, such as, for example, a single frequency optical signal transmitted through a hologram or similar transparency. This operation may be termed "image amplification." To properly amplify such a signal, however, it is necessary that the optical amplifier be capable of providing equal gain for each of the many transverse modes of the input signal without introducing appreciable noise.

SUMMARY OF THE INVENTION

In accordance with one embodiment of the present invention, a bistable optical device utilizes transverse mode switching to define its bistable states. The device comprises a continuous wave laser oscillating under conditions of gain saturation in a particular transverse mode spectrum having at least one transverse mode and being characterized by a cavity resonator which enhances transverse mode competition. Under such conditions, the laser may be switched to oscillation entirely in some preselected transverse mode spectrum by the injection therein of a low level signal matched to the preselected mode spectrum. For example, if the laser is apertured so as to oscillate in only the fundamental transverse mode ($TEM_{00q}$) and the injected signal is a pure second order mode ($TEM_{10q}$), then the laser will switch to oscillation in a pure second order mode ($TEM_{10q}$). Thus a binary output is provided, either $TEM_{00q}$ or $TEM_{10q}$, depending on the absence or presence of the injected signal.

MOde competition is related to the principle that a particular atom can be contribute energy to only one particular mode. Thus, for example, where two different modes compete for the same class of atoms, one of the modes is made to be preferred by making the transfer of energy to that mode more probable than to the other mode, i.e., by the injection of a low level signal of the preferred mode. In order that mode competition be enhanced, it is desirable that the transverse modes satisfy two criteria: (1) frequency overlap, and (2) spatial overlap. The first criterion is satisfied by a cavity resonator that is constructed such that the transverse mode frequencies are either (i) near to each other compared to the homogeneous linewidth of the medium, as in a plane parallel or concentric cavity, both of which are almost degenerate (i.e., all the mode resonances are at approximately the same frequency), or (ii) symmetrically disposed about the center of the laser gain curve, as in the half-degenerate confocal cavity (i.e., half of all the modes are resonant at one frequency and the other half at another frequency). The second criterion is satisfied by a cavity constructed so that the field distribution of the various transverse modes overlap to a maximum degree (for the optical switch embodiment) over the full volume of the active laser medium. Both the plane parallel and concentric cavities provide maximum spatial overlap, whereas the confocal cavity provides minimum spatial overlap. See, for example, Kogelnik, H. and Li,T., "Laser Beams and Resonators," Applied Optics 5, 1550 (1966). It has been found that mode competition in both the plane parallel and concentric cavities favors the lowest order $TEM_{00q}$ mode, whereas mode competition in the confocal cavity favors the highest order mode for which the diffraction loss is sufficiently less than the laser gain.

It is clear therefore that depending upon the particular embodiment of concern, a compromise cavity resonator design may be required. For example, in the case of an optical switch, it is desirable to provide for maximum spatial overlap consistent with having the desired modes oscillate. Although frequency overlap is preferred, frequency degeneracy is not required. Thus, a cavity design approaching either a plane parallel or concentric cavity would appropriate. On the other hand, if the switch in its OFF state were characterized by a higher order mode, then a confocal or near-confocal geometry might be chosen since, as previously pointed out, mode competition favors oscillation in higher order modes.

By contrast, however, in the case of an image amplifier, frequency degeneracy and reduced spatial overlap are preferred. Both the plane parallel and concentric cavities provide degeneracy but both have maximum spatial overlap. Thus a cavity resonator design which deviates somewhat from either concentric or plane parallel in the direction toward confocal is preferred in order to decrease spatial overlap without substantially deviating from degeneracy.

The above methods of transverse mode control are properly characterized as dynamic as contrasted with prior art passive or "loss" control e.g., schemes which use irises spots of absorbing material or holes in mirrors.

BRIEF DESCRIPTION OF THE DRAWINGS

The invention, together with its various features and advantages, can be easily understood from the following more detailed discussion taken in conjunction with the accompanying drawings, in which:

FIG. 1 is a schematic of an illustrative embodiment of the invention;

FIGS. 2A, 2B and 2C are graphs showing respectively the injected, unlocked and locked modes of the present invention in pure binary operation;

FIGS. 3A, 3B and 3C are graphs showing respectively the injected, unlocked and locked modes of the present invention in nonpure binary operation;

FIGS. 4A, 4B, 4C, 4D and 4E are schematics of illustrative cavity resonators in accordance with the principles of the present invention; and FIGS. 5A, 5B and 5C are graphs showing respectively the injected, unlocked and locked modes of an image amplifier in accordance with the present invention.

DETAILED DESCRIPTION

Optical Switch

Turning now to FIG. 1, there is shown a bistable optical device comprising a laser 20 into which is injected a low level signal from another laser 10. Typically, each laser includes an active gaseous medium enclosed in an appropriate container (12 and 22) and a cavity resonator formed by a pair of partially transmissive end reflectors, one of which is planar (14 and 24) and the other of which is concave (16 and 26). The injected signal from laser 10 passes through an isolator formed, for example, by a Glan-Thompson prism 30 and a Faraday rotator 40. The isolator by technique and principle well known in the art transmits the injected signal from laser 10 so as to allow it to pass through the matching lens 50 into laser 20. On the other hand, the isolator prevents any signal from laser 20 from entering laser 10. The matching lens, also by techniques well known, matches the beam diameter and wavefront curvature of the injected signal to the signal produced by laser 20.

In operation, the laser 10 is typically made to oscillate at a single frequency and in a single transverse mode. For example, the insertion of a fine wire 18 along the resonator axis causes the laser 10 to oscillate in the second order $TEM_{01q}$ transverse mode as shown in FIG. 2A. Laser 20, on the other hand, is made to oscillate in the fundamental $TEM_{00q}$ mode by the insertion of an aperture 28 which introduces very little loss for the fundamental transverse mode since its maximum energy density is on the resonator axis, but introduces increasingly higher losses for all higher order modes. The $TEM_{00q}$ transverse mode output of laser 10 is shown in FIG. 2B. The injection of the $TEM_{01q}$ transverse mode signal from laser 10 into laser 20 causes the latter to switch from oscillation in the $TEM_{00q}$ mode to oscillation entirely in the $TEM_{01q}$ mode, as shown in FIG. 2C.

Alternatively, inasmuch as the use of aperture 28 introduces loss for the higher order transverse modes of laser 20 and thus wastes power, it may be desirable to omit the aperture. In this case, the laser 20 would typically oscillate in a mode spectrum comprising a plurality of transverse modes as shown in FIG. 3B. Nonetheless, providing there is sufficient mode competition, the injection of a low level $TEM_{01q}$ signal (FIG. 3A) from laser 10 will still cause laser 10 to switch to oscillation entirely in the injected $TEM_{01q}$ mode (FIG. 3C). In effect, most of the energy from the other modes of laser 20 is transferred into the $TEM_{01q}$ transverse mode producing a larger power output than that attained with the use of aperture 28, all other parameters being equal. Thus, amplification as well as switching occurs. However, such operation is not "purely" binary since the laser is switched from a multimode to a single-mode state rather than between two different single-mode states.

EXAMPLE—OPTICAL SWITCH

The invention as shown in FIG. 1 has been made to operate under the following conditions: Both laser 10 and laser 20 employed 17 cm. discharge tubes (12 and 22) with a 1.5 mm. bore and were filled to a pressure of 2.4 Torr with a gas mixture of $He^3:Ne^{20}$ in the ratio of 5:1. Both lasers oscillated at 6328 A. The laser tubes had an unsaturated gain of about 3.5 percent. Both lasers, however, were operated c.w. under conditions of gain saturation. As discussed previously, the fine wire 18 caused laser 10 to oscillate only in the second order transverse mode, whereas the aperture 28 caused laser 20 to oscillate only in the fundamental transverse mode.

A variety of planar output mirrors 26 were utilized in laser 20 (e.g., 0.4 percent, 1.4 percent and 2.5 percent transmissivity) in combination with a variety of high reflecting concave rear mirrors 24 (e.g., radii of 0.5, 1.0 and 2.0 meters). In particular, the pertinent parameters for laser 20 included: Fresnel number N=4.0; radius of output mirror 26 $R_{26}=\infty$; radius of concave mirror 24 $R_{24}=1$ m. giving a loss for the fundamental mode of <0.01 percent and a loss for the second order mode of 0.1 percent, both of which can be readily calculated utilizing the teachings in an article by T. Li entitled, "Diffraction Loss and Selection of Modes in Maser Resonators with Circular Mirrors," Bell System Technical Journal 44, 917 (June 1965). The frequency spacing between the fundamental and second order transverse modes was 106 MHz. as compared with the full width at half-maximum of the pressure-broadened homogeneous linewidth of the atomic transition which for this He-Ne laser is 380 MHz. (See, Smith, P.W., "Linewidth and Saturation Parameters for the 6328 A Transition in a He-Ne Laser," Journal Applied Physics 37, 2089, Apr. 1966.)

The injected second order mode signal was maintained at 13 db. below the level of the fundamental mode. It was found to be preferably to utilize the highest transmissivity (2.5 percent) planar mirror 26 in order to assure stable switching. Note that the following variations hold true: (1) increasing the strength of the injected signal improves the stability of the switching, (2) decreasing the curvature of the concave mirror 24 results in stable but incomplete switching, i.e., the fundamental mode of laser 20 is not completely suppressed, and (3) decreasing the transmissivity of the planar mirror 26 resulted in less stable but complete switching. It has consequently been found that compromise between nearly plane-parallel and nearly half-confocal cavity geometries enhance switching behavior. This conclusion is reasonable in view of the face that aperturing effects provide high diffraction losses for the higher-order modes in the plane-parallel case, whereas the mode volumes differ maximally (i.e., minimum spatial overlap) in a confocal cavity.

Image Amplifier

The concept of transverse mode switching with gain, as discussed with reference to FIGS. 1 and 3 finds useful applications in systems where it is desired to amplify a single frequency complete signal. By "complex" it is meant that the signal, though of a single optical frequency, is characterized by a plurality of transverse modes. As previously mentioned, such a signal might be derived from a transparency or might be produced by distortion in a transmission medium. In either case it is desirable to amplify all the transverse modes by the same amount. While it is possible to amplify the input signal by passing it through a laser medium not contained in a cavity resonator, such a technique provides only single pass gain. If the active medium is contained in a cavity resonator, however, higher multiple pass gain is provided at the resonant frequency of the cavity resonator.

Consider, for example, a single frequency complex signal having transverse mode spectrum characterized by the four lowest order transverse modes as shown in FIG. 5A. The signal when injected into a laser oscillator oscillating in the six lowest order modes, as shown in FIG. 5B, will cause the oscillator to spatially lock to the input signal, i.e., the oscillator will switch to oscillation entirely in the transverse modes of the injected signal with the same ratio of amplitudes, as shown in FIG. 5C, the energy in all other modes being transferred to the injected modes with consequent "image" amplification of the input signal. Image amplification occurs only if certain conditions are satisfied, namely (1) the cavity resonator of the laser oscillator is preferably frequency degenerate at the frequency of the input signal inasmuch as all the input modes are at a single frequency, (2) transverse mode competition is preferably reduced, but not eliminated entirely, in order that the oscillator lock to the input signal modes, but now switch to oscillation in any particular dominant mode, (3) the oscillator should be characterized by net gain for oscillations in at least as many transverse modes as are in the input signal to be amplified, and (4) the oscillator provides substantially equal gain for all these transverse modes. This latter requirement is satisfied by the use of a high transmissivity mirror (e.g., mirror 24 of FIG. 1) through which the injected signal is coupled to the image amplifier, the effect of which is to make the transmission loss the dominant part of the total loss for each mode and thereby minimize the significance of diffraction losses which are different for each mode. Consequently, each mode effectively experiences the same loss and, since each is resonant at the same frequency, each experiences the same gain.

High Brightness Apparatus

In many applications (e.g., Raman scattering studies or cutting and welding operations), it is desirable to have a maximum brightness coherent beam; that is, maximum power per square centimeter per steradian. Typically, this is accomplished in the prior art by constraining a high power laser oscillator to fundamental mode operation by the use of loss devices to suppress higher order modes. Dynamic transverse mode control in accordance with the present invention can be used to constrain a high power oscillator to fundamental mode operation, without the sacrifice of total power, by injecting a fundamental mode signal into the oscillator cavity resonator which enhances transverse mode competition. Preferably resonators are those nearly plane parallel or concentric configurations which favor oscillation in the fundamental mode but do not totally suppress all higher order modes (i.e., the fundamental mode volume is large).

Alternate Cavity Resonator Configurations

Various cavity resonator configurations useful in accordance with the principles of the present invention are shown in FIGS. 4A to 4E. Two degenerate cavities which provide maximum spatial overlap of the transverse modes are the concentric and plane parallel cavities shown, respectively, in FIGS. 4A and 4B. in the concentric cavity of FIG. 4A, the spherical mirrors are separated by a distance $L=2R$, where R is the radius of each mirror. The concentric cavity, however, provides maximum spatial overlap only if the gain medium occupies most of the volume of a cavity resonator which, of course, tends to maximize gain. Such an arrangement is advantageous to transverse mode switching inasmuch as mode competition is maximized. On the other and, if the gain medium is concentrated in a small region near the center of the concentric cavity, then there would be less spatial overlap of the transverse modes and hence less mode competition, an arrangement advantageous to image amplification if the reduction in gain resulting from the use of a smaller volume active medium can be tolerated.

In the plane parallel cavity of FIG. 4B, each mirror has a radius $R=\infty$, of course, and are separated by a distance $L$. Although frequency degeneracy and maximum spatial overlap are provided, thus making the resonator advantageous to mode switching, the use of plane parallel mirrors is disadvantageous from an alignment standpoint since it is difficult to maintain parallelism between the planar mirrors. In cavity configurations which approach either plane parallel or concentric, but are not exactly either, the spatial overlap may be considerably less than maximum and yet the resonator remains essentially degenerate, thus making such designs advantageous to image amplification.

The confocal cavity, as shown in FIG. 4C, however, is useful in an optical switch in which the OFF state is a higher order mode. But the cavity configuration with the radius R of the mirrors equal to the mirror separation L provides only half-frequency degeneracy and therefore is not preferred for image amplification even though the confocal cavity minimizes spatial mode competition. A similar limitation is placed on the half-confocal cavity shown in FIG. 4D. However, the modified confocal cavity shown in FIG. 4E both frequency degeneracy and minimum spatial overlap as preferred in an image amplifier. The resonator comprises a pair of spherical mirrors of radii $R_1$ and $R_2$, the one of radius $R_1$ being spaced a distance $L_1$ from a convex lens and the other being spaced a distance $L_2$ from the opposite side of the same lens where $R_1=L_1$, $R_2=L_2$, and $$f=\frac{L_1 L_2}{L_1+L_2}$$

$f$ being the focal length of the lens.

It is to be understood that the above-described arrangements are merely illustrative of the many possible specific embodiments which can be devised to represent application of the principles of the invention. Numerous and varied other arrangements can be devised in accordance with these principles by those skilled in the art without departing from the spirit and scope of the invention.

In particular, the principles set forth hereinabove are not limited to embodiments employing only gas lasers. Solid state lasers, such as Nd-YAG, are also feasible, the basic idea being the same—to provide a cavity resonator in which allowance is made for both spatial overlap of the various transverse modes and frequency proximity to within the homogeneously broadened linewidth of a mode.

We claim:

1. Optical apparatus comprising:
    a laser oscillator having a cavity resonator in which oscillations are characterized by a first transverse mode spectrum, said oscillator being adapted for continuous wave operation under conditions of gain saturation,
    said cavity resonator being designed to provide for transverse mode competition in said laser oscillator,
    and dynamic means for causing said laser oscillator to oscillate entirely in another preselected transverse mode spectrum comprising means for injecting into said cavity resonator an optical signal characterized by the preselected transverse mode spectrum, said transverse mode competition thereby causing optical energy in the modes of the first transverse mode spectrum to be transferred to the modes of the preselected transverse mode spectrum.

2. The optical apparatus of claim 1 wherein said cavity resonator is designed such that all of the transverse mode resonant frequencies are near to each other compared to the homogeneous linewidth of a mode, and such that the transverse modes spatially overlap.

3. The optical apparatus of claim 1 wherein said cavity resonator is degenerate, all of the transverse mode resonances being at the same frequency.

4. The optical apparatus of claim 1 wherein said cavity resonator is half-degenerate, one-half of the transverse mode resonances being at one frequency and the other half at another frequency, the two frequencies being symmetrically spaced about the peak of the laser gain curve.

5. The optical apparatus of claim 1 for use as a binary optical switch comprising:
    means for causing said laser oscillator to oscillate in a single transverse mode, and wherein
    said injecting means comprises means for injecting into said cavity resonator an optical signal characterized by another single transverse mode, and
    maximum transverse mode competition is provided in said cavity resonator designed to maximize the spatial overlap of the transverse modes and to cause all of the transverse mode resonant frequencies to be near to each other as compared to the natural linewidth of a mode.

6. The optical apparatus of claim 5 wherein said cavity resonator comprises a pair of spherical reflectors concentrically disposed with respect to one another.

7. The optical apparatus of claim 5 wherein said cavity resonator comprises a pair of planar reflectors disposed parallel to one another.

8. The optical apparatus of claim 1 for use as an image amplifier wherein said cavity resonator is designed to have at least as many transverse modes as the injected optical signal, to reduce transverse mode competition in said laser oscillator by reducing the spatial overlap of the transverse modes, to provide for approximately equal net gain of each of the transverse modes, and to be frequency degenerate at the frequency of the injected optical signal.

9. The optical apparatus of claim 8 wherein said cavity resonator comprises a pair of spaced reflectors said optical signal being injected into said cavity resonator through one of said reflectors, said one reflector having high transmissivity thereby to provide equal gain for each of the transverse modes by making transmission loss the dominant part of the total loss in said laser oscillator as compared to the diffraction losses of the transverse modes.

10. The optical apparatus of claim 8 wherein said cavity resonator configuration is nearly concentric and between concentric and confocal.

11. the optical apparatus of claim 8 wherein said cavity resonator configuration is nearly plane parallel and between confocal and plane parallel.

12. The optical apparatus of claim 8 wherein said cavity resonator configuration is concentric and the active medium of said laser oscillator is confined to a small volume at the center of said cavity resonator so as to reduce the spatial overlap of the transverse modes.

13. The optical apparatus of claim 8 wherein said cavity resonator comprises a pair of spaced spherical reflectors of radii $R_1$ and $R_2$, respectively, a convex lens disposed coaxially between said spaced reflectors a distance $L_1$ from the reflector of radius $R_1$, and spaced a distance $L_2$ from the reflector of radius $R_2$, and wherein the focal length of said lens is approximately $$f = \frac{L_1 L_2}{L_1 + L_2}$$

14. The optical apparatus of claim 1 for use as a high brightness device wherein said cavity resonator is designed to maximize transverse mode competition, such competition favoring oscillation in the fundamental transverse mode, and wherein said injecting means comprises means for injecting into said cavity resonator an optical signal characterized by only the fundamental transverse mode.

15. The optical apparatus of claim 14 wherein said cavity resonator comprises a pair of spaced spherical reflectors disposed concentrically with respect to one another.

16. The optical apparatus of claim 14 wherein said cavity resonator comprises a pair of spaced parallel reflectors disposed parallel to one another.